United States Patent [19]

Suzuki et al.

[11] 3,849,220

[45] Nov. 19, 1974

[54] METHOD FOR MAKING CORDLESS TIRES

[75] Inventors: Yasuo Suzuki; Iwao Arimura; Tatsuo Arai, all of Tokyo, Japan

[73] Assignee: Bridgestone Tire Company Limited, Tokyo, Japan

[22] Filed: Dec. 21, 1971

[21] Appl. No.: 210,509

[30] Foreign Application Priority Data

Dec. 24, 1970 Japan................................ 45-117206
July 10, 1971 Japan................................ 46-40545

[52] U.S. Cl.............. 156/110 R, 156/113, 156/125, 156/123, 156/245, 152/330, 264/94, 264/268, 264/326
[51] Int. Cl.............................................. B29h 17/00
[58] Field of Search........... 156/113, 123, 125, 128, 156/110, 133, 394, 129, 125, 245, 131, 398; 264/94

[56] References Cited

UNITED STATES PATENTS

| | | | |
|---|---|---|---|
| 1,289,767 | 12/1918 | Hopkinson........................... | 156/123 |
| 1,409,154 | 3/1922 | Davis..................................... | 264/94 |
| 1,474,149 | 11/1923 | Hopkinson et al................... | 156/123 |
| 2,497,226 | 2/1950 | McNeil.............................. | 156/128 X |
| 2,710,425 | 6/1955 | Rhodes............................ | 156/394 X |
| 3,142,597 | 7/1964 | Anderson et al.................. | 156/123 |
| 3,143,449 | 8/1964 | Bosomworth et al............. | 156/123 X |
| 3,192,984 | 7/1965 | Bourdon........................... | 156/123 X |
| 3,218,209 | 11/1965 | Travers et al....................... | 156/123 |
| 3,466,211 | 9/1969 | McHugh........................... | 156/128 R |
| 3,686,389 | 8/1972 | Beneze............................. | 156/110 X |
| R21,063 | 4/1939 | Voit.................................. | 264/94 X |

OTHER PUBLICATIONS

"Vanderbilt Rubber Handbook," 1958, R. T. Vanderbilt Co., Inc., 230 Park Ave., New York City, copyright 1958, frontispiece and pgs. 508, 509, 511.

*Primary Examiner*—Clifton B. Cosby
*Attorney, Agent, or Firm*—Fleit, Gipple & Jacobson

[57] ABSTRACT

A method for making a cordless tire with a hollow tubular hub whose longitudinal axis is aligned with the axis of rotation of the tire. The method comprises steps of forming a pair of outwardly extending annular flanges at the opposite ends of the tubular hub, forming a disk flange at the central portion of the tubular hub at right angles to the axis of rotation of the tire, extending a hollow rubber shell from one of the outwardly extending annular flanges to the opposite annular flange, shaping an expanded ring portion within the shell in the proximity of each of the annular flanges, bonding the rubber shell to the hub while strengthening the bond of the shell to the annular flange by said expanded ring portion so as to form a tire case, molding and vulcanizing the tire case in a two-half mold assembly.

9 Claims, 20 Drawing Figures

METHOD FOR MAKING CORDLESS TIRES

BACKGROUND OF THE INVENTION

1. Field of the Invention

This invention relates to a method of making a cordless tire having elastomeric sidewalls and an elastomeric tread wall and a rigid hub integrally connected to the sidewalls so as to define an inflatable toroidal space by the rigid hub, elastomeric sidewalls, and the elastomeric tread.

2. Description of the Prior Art

A typical pneumatic tire which is presently used comprises a toroidal carcass means extending across a pair of spaced beads, the carcass means consisting of one or more plies each made of rubberized cords, a pair of rubber sidewalls covering the outer surface of the carcass means at opposite side portions thereof, and a rubber tread mounted on the crown portion of the carcass. With such pneumatic tire of known construction, the mechanical load to the tire is mostly borne by the carcass, especially by the cords constituting the carcass means. It is necessary in pneumatic tires to provide an internal pneumatic pressure for ensuring the desired performance characteristics of the tire, and such internal pneumatic pressure is mostly borne by the cords of the carcass means. The aforesaid construction of the pneumatic tire have been made by stretching the carcass means on a cylindrical former, mounting beads to the carcass means thus stretched, applying rubber sidewalls and rubber tread to the carcass for making a cylindrical case, shaping the cylindrical case into a toroidal form, and vulcanizing or curing the toroidal case at an elevated temperature under pressure. Such process of making the pneumatic tire is very complicated, and it requires special skill, especially in stretching the carcass ply on the cylindrical former.

To simplify the process of making the pneumatic tire and to mitigate the need of skilled labor in stretching and forming the tire carcass plies, it has been proposed to use a cordless tire or a pneumatic tire which does not include any cords. With the cordless tire, the process of stretching the carcass ply or plies on the cylindrical former can completely be dispensed with, so as to result in a considerable saving in labor and cost.

On the other hand, the mechanical strength of the cordless tire has been inferior to that of conventional pneumatic tire having corded carcass plies, because the materials used for making the rubber sidewalls and the rubber tread of the cordless tire are not so strong as the carcass plies made of rubberized cords. As a result, the application of the cordless tire has been limited to activities which can be served by tires with comparatively low internal pressure, such as recreational facilities and agricultural machines.

The cordless tire which has been proposed heretofore has a shortcoming in that it is difficult to provide sufficient airtightness at the seal between the rubber sidewalls of the tire and a rim to which the tire is mounted. In the case of conventional pneumatic tire to be operated at a comparatively high internal pressure, excellent self-sealing effect can be achieved by the high internal pressure per se. The inability of the conventional cordless tire to withstand a high internal pressure results in an insufficient sealing between the rubber sidewalls and the rim.

To obviate such shortcoming of the conventional cordless tire, U.S. Pat. No. 3,425,475, which was granted to Kenneth A. Hoy on Feb. 4, 1969, disclosed a one-piece, inflatable low-pressure balloon tire with integral hub for rimless mounting on a driving axle. The construction of this U.S. Patent is highly desirable, because the integral formation of the hub and the ballon ensures a high air-tightness at the joint between the ballon and the hub, so as to improve the maximum internal pressure which the cordless tire can withstand. The ballon tire of U.S. Pat. No. 3,425,475 has a shortcoming in that it is difficult to manufacture. More particularly, if one tries to manufacture the ballon tire of this U.S. Patent by molding, it is very difficult to remove a core from the ballon tire after the molding.

Several methods for making cordless tires have been proposed heretofore, such as a casting process as disclosed by Japanese Patent Publication No. 25,203/1964 and an injection process as disclosed by U.S. Pat. No. 2,744,290, but none of the known processes has made it possible to mold a ballon tire having a hub integrally secured thereto. The problem of the core removal after the molding the integral ballon tire has not been solved yet.

Therefore, an object of the present invention is to provide an improved method for making cordless tires.

SUMMARY OF THE INVENTION

According to the present invention, there is provided a method for making a cordless tire having a hollow cylindrical hub with a longitudinal center line coinciding with the axis of rotation of the tire and a pair of outwardly extending annular flanges integrally formed with said hub at the longitudinally opposite ends thereof, and a shaped rubber shell extending from one of the pair of annular flanges to the other, said hub having a disk flange integrally secured to the hub at the longitudinal center thereof at right angles to said longitudinal center line, the method comprising steps of preshaping the rubber shell while thickening those edge portions which are to be bonded to said annular flanges of the hub, securing an air valve to the sidewall of said hub, placing said hub and said preshaped rubber shell in a two-half mold so as to define a gastight space enclosed by said rubber shell and said hub, each half of the mold having a centrally located stud fitting into the hollow space of said cylindrical hub until the extended end of the stud substantially engages said disk flange of the hub, filling said space enclosed by the rubber shell and said hub with an inactive gas through said air valve to a pressure higher than an atmospheric pressure, said inactive gas reacting with neither of the hub and the rubber shell at a vulcanizing temperature, and vulcanizing said rubber shell at an elevated temperature, so as to bond said rubber shell to said outwardly extending flanges of the hub.

Preferably, the rubber shell is made of two halves to be joined along the equator or peripheral center line of the tire, and the hub is also made of two cup-like halves to be joined at bottoms thereof so as to form the aforesaid hub having the disk flange at the longitudinal center thereof. With such halved rubber shell and halved hub, the desired cordless tire can be made by simultaneously shaping the two halves of the rubber shell while preconnecting each half shell to the corresponding cup-like half hub, and then bonding the two halves together along the peripheral center line of the tire and at the disk flange of the hub.

To ensure the bond between the annular flanges of the hub and the rubber shell, suitable intermediate bead rubber rings may be presecured to the annular flanges, which rubber rings are firmly bondable to both the hub and the rubber shell.

BRIEF DESCRIPTION OF THE DRAWINGS

For a better understanding of the invention, reference is made to the accompanying drawings, in which.

Like parts are designated by like numerals and symbols throughout the drawings.

DESCRIPTION OF THE PREFERRED EMBODIMENT

Figure 1:
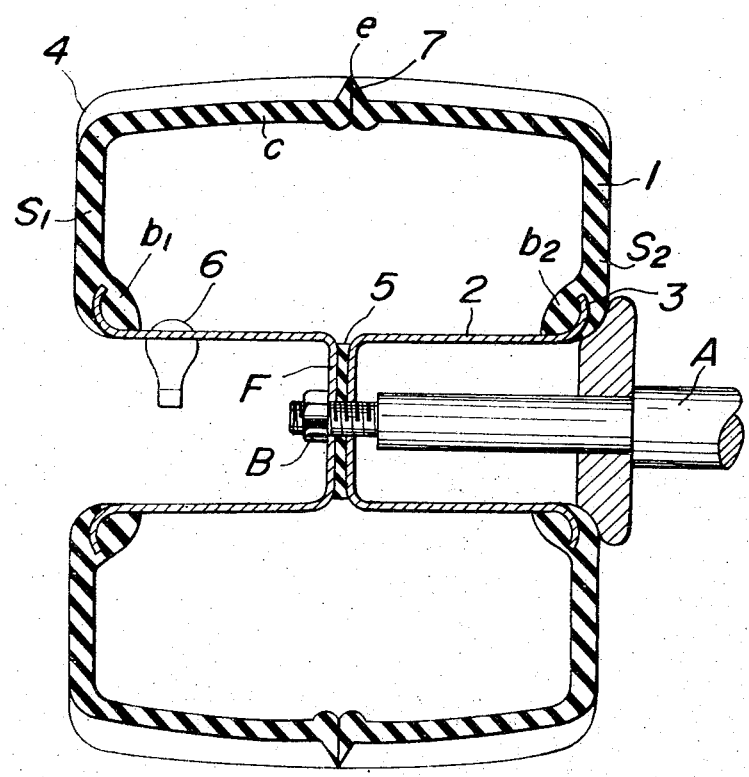
FIG. 1 is a sectional view of a cordless tire to be made by the method according to the present invention.
Figure 2:
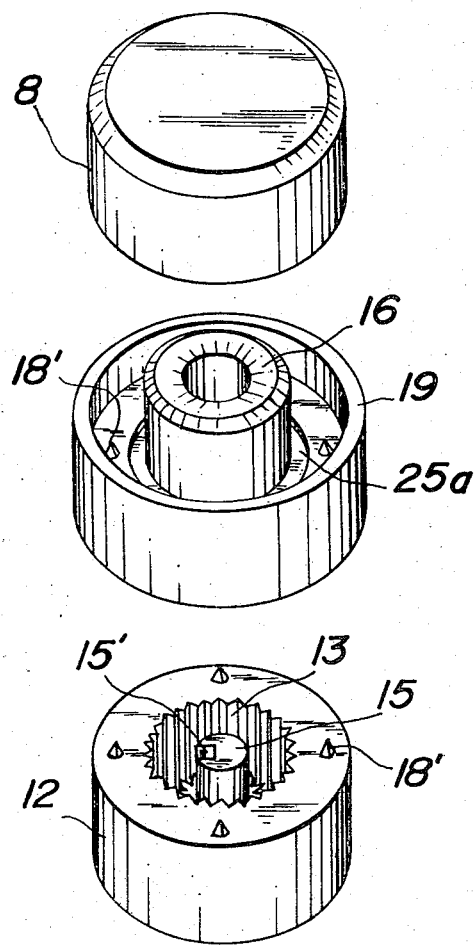
FIG. 2 is an exploded perspective view of a mold assembly to be used in the method according to the present invention.

Referring to FIG. 1, a cordless tire to be made by the method according to the present invention comprises a tire body 1 or a shaped rubber shell and a hub 2. The tire body 1 has a pair of sidewalls $S_1$ and $S_2$ and a tread crown C connecting the sidewalls. The inner ends of the sidewalls $S_1$ and $S_2$ are bonded to outwardly extending annular flanges 3 of the hub 2. The sidewalls $S_1$ and $S_2$ are enlarged at their connection to the annular flanges 3, so as to form beads $b_1$ and $b_2$, respectively.

A suitable tire pattern 4 is formed on the peripheral surface of the tread crown C of the tire body 1. The tire body 1 of the cordless tire, as shown in FIG. 1 is made of two halves, which are bonded together along the peripheral center line e or the tire equator. To strengthen the bond between the two halves, an annular ridge 7 is formed along the equator of the tire body 1.

The hub 2 of this embodiment comprises two cup-like half hub members 10, 14 (FIGS. 3 – 6), which are bonded together by a sealing rubber layer 5 for providing a disk flange F. This disk flange F may be used for connecting the tire to an axle A by a nut B, so that the tire is driven about the axis of the axle A. An air valve 6 is secured to one of the cup-like hub member, in this case on the hub member 14 (FIGS. 3 – 6), so as to allow the adjustment of the air pressure in the tire.

As can be seen from FIG. 1, the tire to be made by the method according to the present invention does not include any cords, as used in conventional carcass plies, and does not use any breaker strips. The preferable material for making the tire body 1, in the method according to the present invention, is rubber, or reinforced rubber with short fibers or plastics. The hub 2 is preferably made of metallic plates. Those portions of the hub 2 which are bonded to the tire body 1 are preferably pretreated, so as to ensure fast bond between such portions and the tire body 1.

The method for making the cordless tire of FIG. 1 will now be described by referring to FIGS. 2 to 6. As pointed out in the foregoing, the tire consists of two halves, which are juxtaposed along a plane of the equator of the tire. Such two halves of the tire are simultaneously formed by molding, and then bonded together, by using a mold assembly, as shown in FIG. 2 and FIGS. 3 to 6. The mold assembly comprises an upper half mold 8 with a cavity 9, a lower half mold 12 with a cavity 13, and a core 16 carried by a core holder 19. The core 16 has a smooth surface 17 which is to face the inside wall surfaces of the cavities 9 and 13 with a suitable spacing therefrom. The spaces between the smooth core surface 17 and the surfaces of the cavities 9 and 13 are used for molding the tire body 1. The smoothness of the surface 17 of the core 16 is important as will be described hereinafter.

Each of the two half molds has a centrally located cylindrical stud 11 or 15, whose diameter is such that the studs 11 and 15 snugly fit in the corresponding cup-like hub members 10 and 14, respectively. The stud 15 of the lower half mold 12 has an axial groove 15' formed on the peripheral surface thereof, so as to receive the air valve 6 when the cup-like hub member 14 is fitted on the stud 15. A recess 16a is bored on the surface of the core 16 at the portion facing the axial groove 15', so as to position the inner end of the air valve 6 therein when the tire body 1 is molded.

The core 16 is secured to the core holder 19 through a spacer 18. The function of the spacer 18 will be described hereinafter. To index the half molds 8, 12 and the core 16 in position, indexing projections 18' and cooperating recesses 18'' are formed on the upper surfaces of the lower half mold 12 and the spacer 18 and on the lower surfaces of the upper half mold 8 and the spacer 18, respectively. The inner cylindrical surface of the core holder 19 also acts to keep the two half molds 8 and 12 in position relative to each other.

The inner surface of the upper and lower half molds 8 and 12 may be so formed as to produce the desired tread pattern 4. On the other hand, the outer surface of the core 16 must be finished very smoothly, so as to ensure the flow of rubber material during the molding operation.

Annular grooves 25a are formed on the opposite surfaces of the spacer 18, at the joint between the spacer 18 and the core 16. The function of the annular grooves 25a will be described hereinafter.

Figure 3:
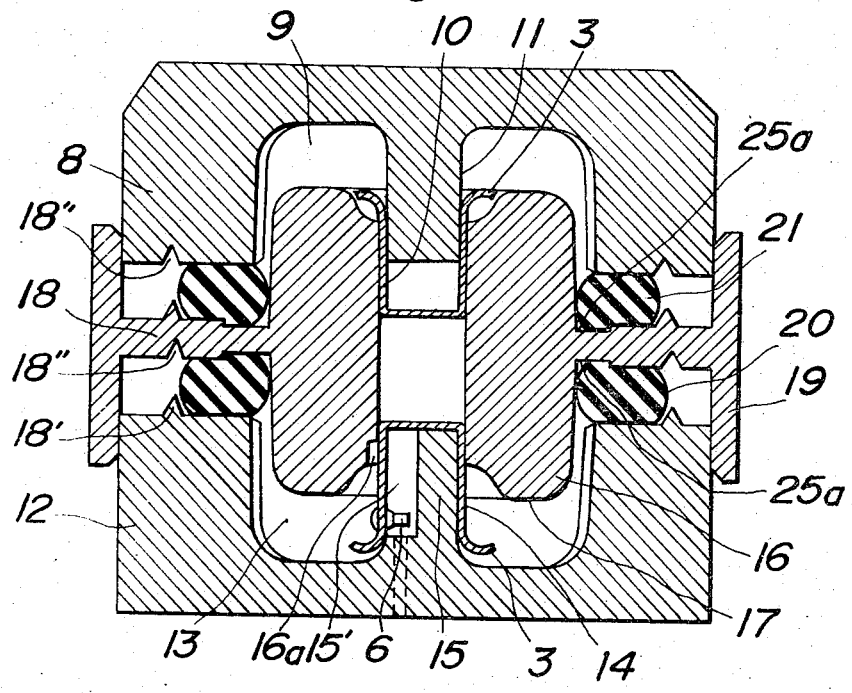
FIGS. 3 to 6 are sectional views, illustrating different stages of making the cordless tire of FIG. 1 by the mold assembly of FIG. 2.

To mold the cordless tire, the upper half mold 8 and the lower half mold 12 are preheated. The core 16 may be preheated, but it may also be used without preheating to maximize the workability of starting material. The cup-like hub member 14 having the air valve 6 presecured thereto is fitted in the cylindrical stud 15 of the lower half mold 12. A suitably measured amount of starting rubber material 20 is placed on the upper surface of the lower half mold 12, which material 20 is preferably preformed into an annular shape, as seen from FIG. 3. The core 16 is placed on the lower half mold 12 in position, so that the spacer 18 lies on the starting rubber material 20. Similarly, the same amount of the starting rubber material 21 is placed on the top surface of the spacer 18, as shown in FIG. 3. Thereafter, the upper half mold 8 and the other cup-like hub member 10 are placed on the spacer 18 in position. The half molds 8, 12 and the core 16 can be placed in register with each other by means of the aforesaid indexing projections 18', the coacting recesses 18'', and the inner surface of the core holder 19. The cup-like hub member 10 may be fitted in the central hole of the core 16 prior to placing the upper half mold 8 on the core 16, or the hub member 10 may be fitted in the cylindrical stud 11 of the upper half mold 8 so as to engage the core 16 when the upper half mold is placed on the core 16.

The outwardly extending annular flanges 8 of the hub members 10 and 14 are preferably pretreated for ensuring fast bond of the rubber material thereto.

Figure 4:
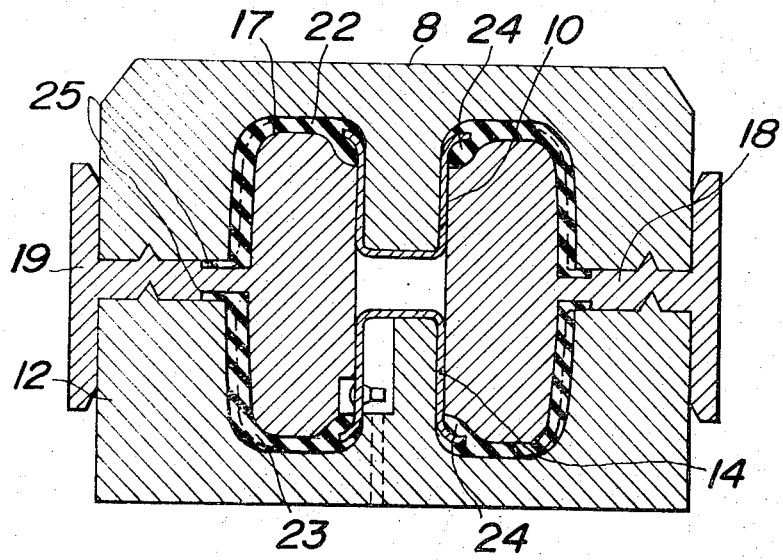

After the starting material and the molds are thus assembled, as shown in FIG. 3, the two half molds 8 and 12 are forced toward each other, for instance, by pressing the upper half mold 8 downwards. As a result, the starting rubber materials 20 and 21 flow along the smooth surface 17 of the core 16, due to the heat and pressure from the half molds 8 and 12, so as to mold two half tire bodies 22 and 23 separately. Each half tire body 22 or 23 has a bead portion 24 which is securely bonded to the annular flange 3 of the corresponding cup-like hub member 10 or 14, as shown in FIG. 4. A sidewall portion and a tread portion of the tire body 1 are contiguously molded in each of the half tire bodies 22 and 23.

The desired tread pattern 4 is formed on the outer surface of each half tire body 22, 23, in accordance with the configuration of the inner surface of the half molds 8 and 12. It should be noted here that annular lugs 25 are integrally formed on the equator side edges of the half bodies 22 and 23 opposite to the hub members 10 and 14, respectively. The annular lugs 25 are molded by virtue of the annular grooves 25a formed on the opposite surfaces of the spacer 18. The annular ridge 7 at the central peripheral portion e of the cordless tire, as shown in FIG. 1, will be made by bonding the annular lugs 25 of the two half tire bodies 22 and 23, as will be described hereinafter.

Figure 5:
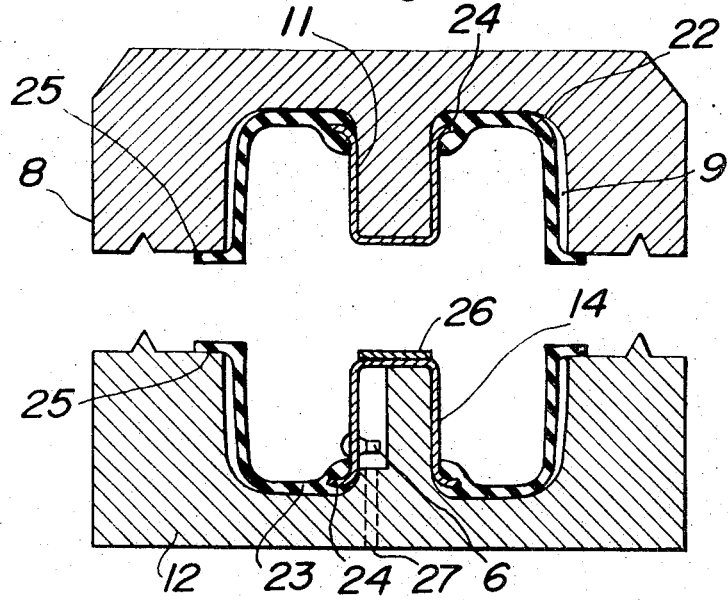

The two half molds 8 and 12 are separated from each other immediately after the aforesaid two half tire bodies 22 and 23 are molded. For instance, the upper half mold 8 is raised away from the lower half mold 12, as shown in FIG. 5. The two half bodies 22 and 23 should preferably be kept unvulcanized in this stage of the tire making process. With the two half molds 8 and 12 are thus separated, the core 16 is removed from the mold assembly and a sealing rubber disk 26 is placed on the bottom plate portion of the cup-like hub member 14, so as to let the rubber disk 26 to face the corresponding bottom portion of the other cup-like hub member 10, as depicted in FIG. 5.

When the two half molds 8 and 12 are moved away from each other, it is necessary to keep the half tire bodies 22 and 23 as attached to the half molds 8 and 12, respectively, by separating the half tire bodies from the core 16. The aforesaid very smooth finishing of the outer surface 17 of the core 16 facilitates the separation of the half tire bodies 22, 23 from the core 16. The inner surface of the half molds 8 and 12 may somewhat be roughened, at least in comparison with the surface 17 of the core 16, for this purpose. Furthermore, to keep the core 16 cooler than the half molds 8 and 12 will help the aforesaid separation of the half tire bodies 22, 23 from the core 16. A small amount of air may be fed to the gap between the half tire bodies 22, 23 and the core 16 through the air valve 6 and a passage 27 of the lower half mold 12, so as to facilitate the separation of the former from the latter.

The sealing rubber disk 26, as shown in FIG. 5, should be made of crude rubber, so that it bonds the two cup-like hub members 10 and 14 in a sealing fashion, in the following vulcanizing stage.

A suitable means should be provided for clearing the air valve 6 from the half tire body 23. For instance, a small porous member (not shown) may be applied to the tire inside end of the air valve 6 during the molding of the half tire bodies, which porous member may be removed when the two half molds 8 and 12 are separated as shown in FIG. 5.

Figure 6:
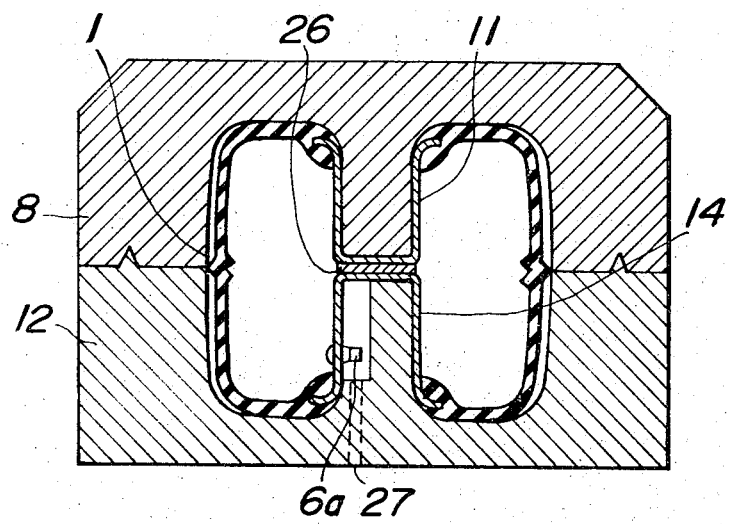

Then, the two half molds 8 and 12 are forced to come in direct engagement, in register with each other, as shown in FIG. 6. The inner space of the tire, defined by the half tire bodies 22, 23 and the hub members 10, 14, is now pressurized by filling air or steam therein through the air valve 6 and the passage 27 of the lower half mold 12. Such pressurization is possible because the annular lugs 25 of the two half tire members 22 and 23 are now gastightly joined by the direct engagement of the two half molds 8 and 12, without the spacer 18. Such direct engagement of the two half molds 8 and 12 also causes the sealing rubber disk 26 to gastightly adhere to the two half hub members 10 and 14, so as to securely connect the two half hub members.

If the inner space of the tire is filled with steam, both the pressure and the heat of the steam will simultaneously be applied to the tire, so as to quicken the vulcanization. In any case, the pressure of the inner space of the tire should be raised for ensuring effective vulcanization, but it should be low enough lest it should make the rubber spongy. Under the pressure thus applied, the half molds 8 and 12 may be heated, for effecting the vulcanization, until the projection 7 at the peripheral center e, the junction of the two half hub members 10, 14, and the connection of the bead portions 24 to the annular flanges 3 are all securely bonded.

When the aforesaid vulcanization is finished, the desired cordless tire is completed.

With the method according to the invention, the tire tread pattern 4 is formed together with the molding of the half tire members 22, 23, so that such patterns can be made very accurately. Thus, the risk of causing dissymmetry of such tread pattern is greatly reduced.

In the embodiment, as shown in FIGS. 2 to 6, the half molds 8 and 12 are used for both the molding and the vulcanizing stages. It is, however, possible to use different molds for the molding and the vulanizing stages, respectively.

As apparent from the foregoing description, the present invention provides a very simple method for making cordless tires, while ensuring high dimensional symmetry and very low dimensional dispersions. The simplicity of the method also results in an improved economy of the tire making process.

Although two half hub members 10 and 14 are used, such two members are bonded simultaneously with the joining of the two half tire bodies 22, 23, so that there is no need to undertake separate welding of such half hub members 10 and 14.

Figure 7:
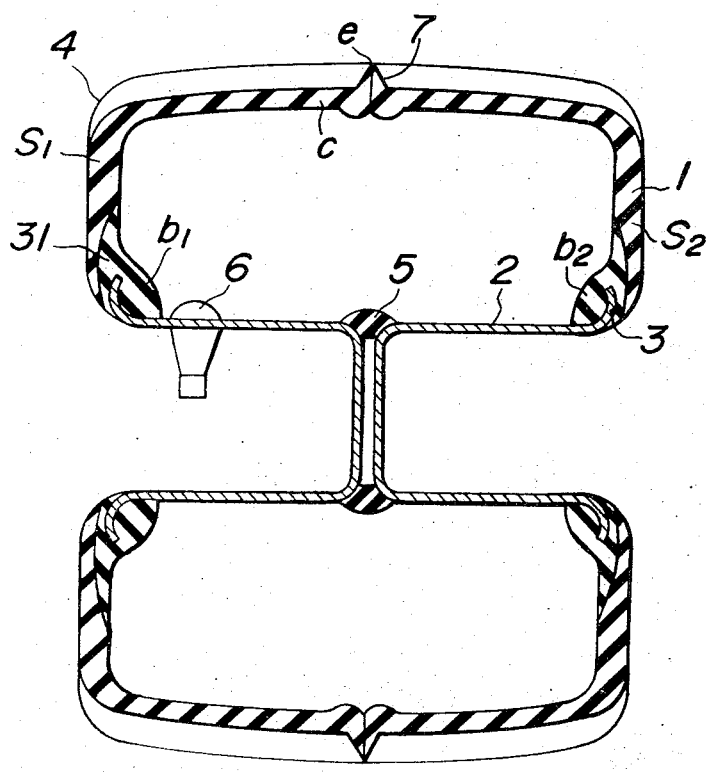
FIG. 7 is a different cordless tire to be manufactured by the method according to the present invention.

In order to ensure strong bond between each of the half tire members 22, 23 and the annular flange 3 of each cup-like hub members 10 or 14, it is possible to preform the bead portions $b_1$ and $b_2$ by separately securing bead rubber rings 31 to the flanges 3, as shown in FIG. 7. The bead rubber rings 31 may be made of highly adhesive rubber material, which is different from the rubber material for the tire body 1.

FIGS. 8 to 11 illustrate different stages for molding the cordless tire of FIG. 7. Half tire bodies 22, 23 for this cordless tire can be made by using a mold assembly consisting of an upper half mold 8, a spacer 18, and a lower half mold 12, which are similar to the corresponding parts of the mold assembly described in detail hereinafter by referring to the embodiment of FIGS. 2 to 6 except two points; namely, the contour surface of the core 16, and the manner in which the cup-like hub members 10 and 14 are bonded with each other and to the rubber tire 1.

Figure 8:
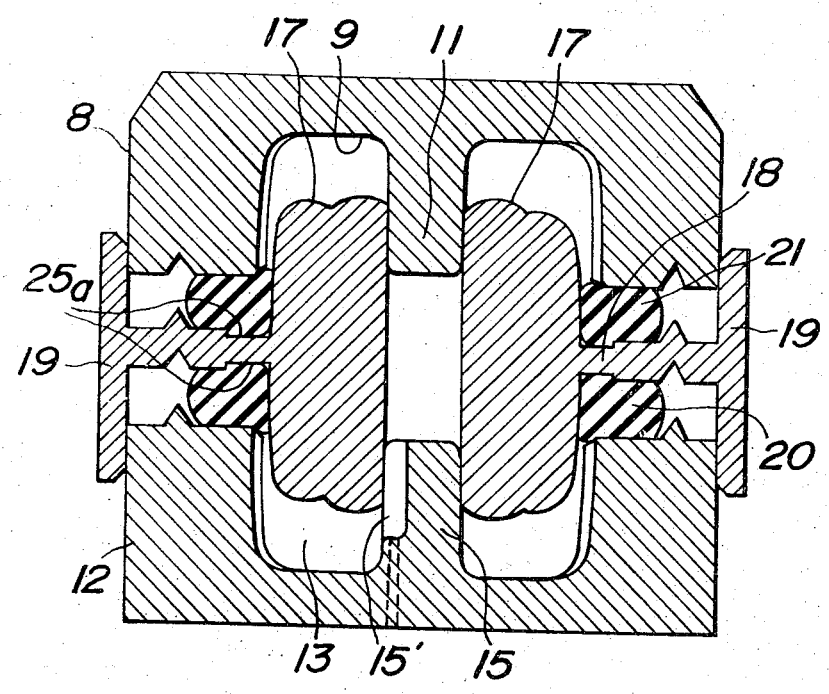
FIGS. 8 to 11 are schematic sectional views, illustrating different stages of making the cordless tire of FIG. 7.
Figure 9:
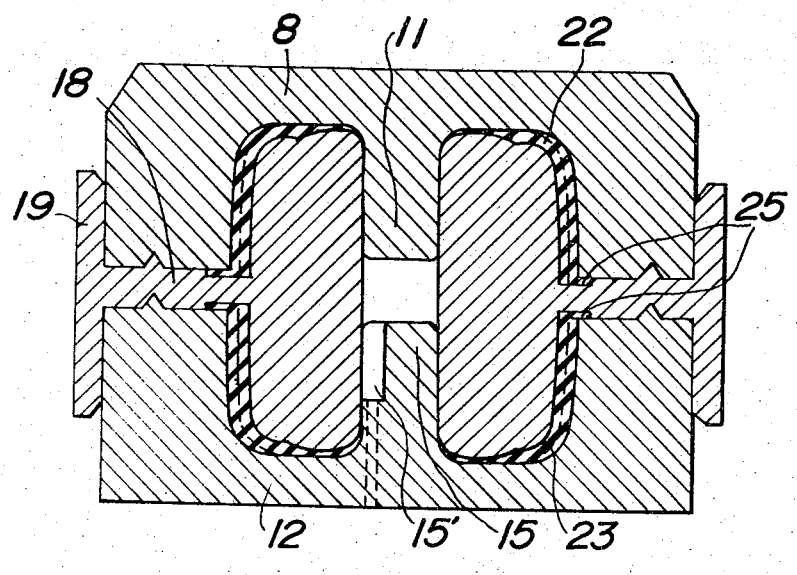

As can be seen from FIGS. 8 and 9, the half tire bodies 22 and 23 are formed independently of the hub members 10 and 14, and the half tire bodies 22 and 23 do not have any enlarged bead portions 24. Instead, the hub side ends of the two half tire bodies are gradually thinned as they extend toward the hub members, so as to be properly bonded with separately prepared bead rubber rings 31.

Figure 10:
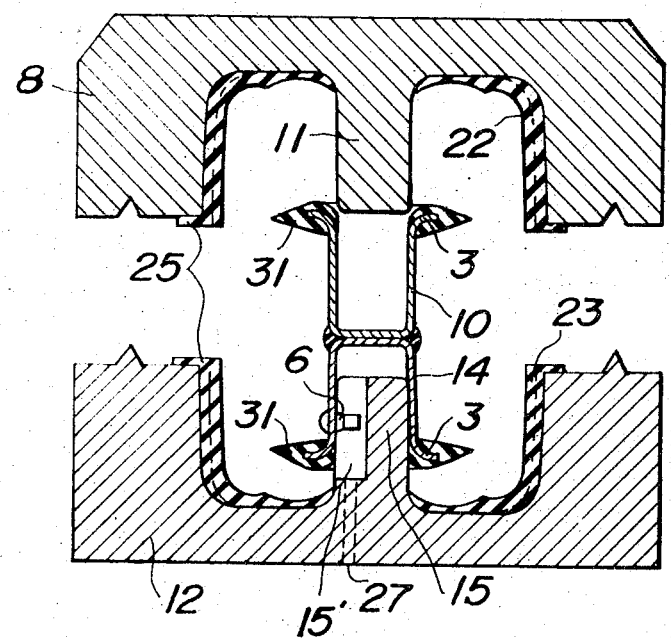

Referring to FIG. 10, each bead rubber ring 31 may be formed by cold press or extrusion of crude rubber. The bead rubber ring 31 thus formed is secured to the outwardly extending annular flange 3 of each half hub member 10 or 14, so as to completely enclose the annular flange 3 with the bead rubber ring 31. To ensure fast bond between the hub flange 3 and the bead rubber ring 31, the surfaces of the flange may be pretreated for enhancing the adhesion of the rubber ring 31 thereto. The bead rubber rings 31 may be connected to the corresponding half tire members 22 and 23 before vulcanization. If the bead rubber rings 31 are vulcanized before being connected to the half tire bodies, the surface of the bead rubber ring 31 to be bonded to the half tire bodies must be thoroughly buffed, and suitable rubber cement must be applied to the bead rubber ring surface thus buffed. The rubber cement may, of course, be applied to the surface of non-vulcanized bead rubber rings 31 for ensuring the fast bond of the bead rubber ring 31 to the half tire bodies 22, 23.

To further enhance the bond of the bead rubber ring 31 to the tire rubber body 1, the cross sectional shape of the bead rubber ring 31 is so selected as to maximize its contact area with tire rubber body 1. More particularly, the thickness of the bead rubber ring 31 is gradually reduced as it extends toward the tread portion C of the tire rubber body 1. On the other hand, the bead side or hub side end of each half rubber body 22 or 23 is gradually thinned as it extends toward the annular flange 3, as pointed out in the foregoing. Thus, a wide contact area is provided between the bead rubber ring 31 and the tire rubber body 1.

It is apparent to those skilled in the art that the separate mounting of the bead rubber ring 31 to the annular flange 3 of the cup-like hub members 10 and 14 ensures very fast bond of the beads to the hub members. Furthermore, with this arrangement of the bead rubber ring 31, its material can be selected so as to maximize its adhesion to the hub. On the other hand, if the bead portion 24 is integrally formed with the half rubber bodies 22 and 23, as shown in FIG. 4, it is very difficult to form the bead portions 24 with different rubber material from the rest of the half tire bodies 22 and 23.

The two cup-like hub members 10 and 14 may be prebonded in alignment with each other by brazing, or by using a sealing rubber layer as described in the foregoing by referring to FIGS. 2 to 6.

Figure 11:
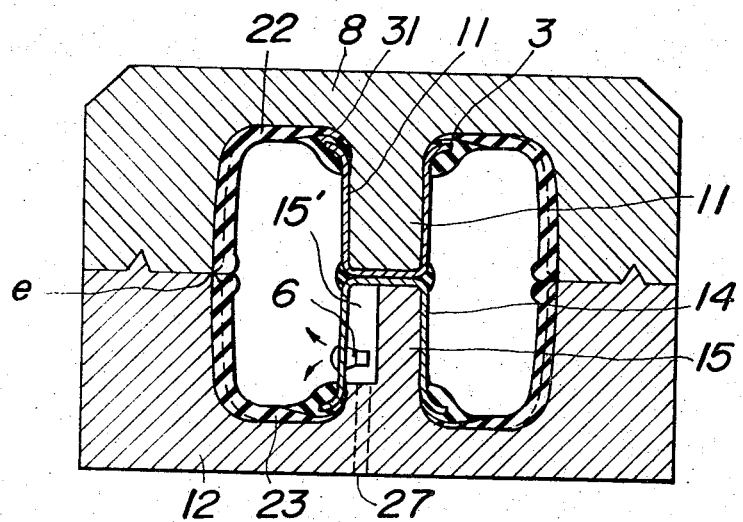

After placing the preformed hub members 10, 14 with the bead rubber rings 31 in alignment with the spaced half molds 8 and 12, as shown in FIG. 10, the two half molds are forced toward each other, for instance, by pressing the upper half mold 8 downwards, until the two half molds come in contact with each other. After the two half molds 8 and 12 are joined as shown in FIG. 11, the inside space of the tire is pressurized and the cordless tire is vulcanized in the same manner as described in detail hereinbefore by referring to FIG. 6.

Figure 12:
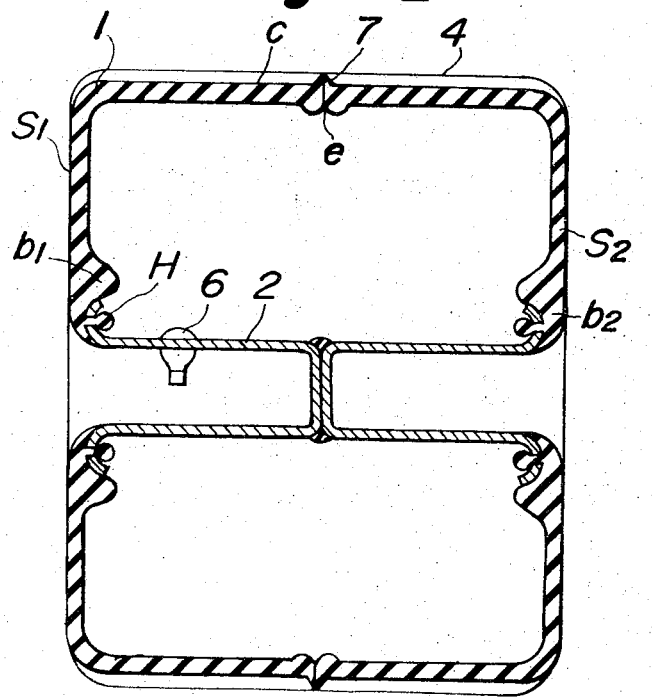
FIGS. 12 to 18 are sectional views, showing another cordless tire which can be made by the method according to the present invention.

Another way of ensuring the bond between the annular flanges 3 of the hub 2 and the rubber tire body 1 is to provide suitable holes H on the flanges 3 so as to cause the rubber material of the tire body 1 to penetrate through such holes H, as shown in FIG. 12. As can be seen from the figure, the outwardly extending flanges 3 are suitably bored, so that bead portions $b_1$ and $b_2$ of the tire rubber body 1 can partially extend from the outer surfaces of the flanges 3 to the inner or the opposite surfaces thereof through the holes H. Such extensions of the rubber beads $b_1$ and $b_2$ through the holes H of the end flanges 3 of the hub 2 enhances the bond of the tire rubber body 1 to the hub 2.

Figure 13:
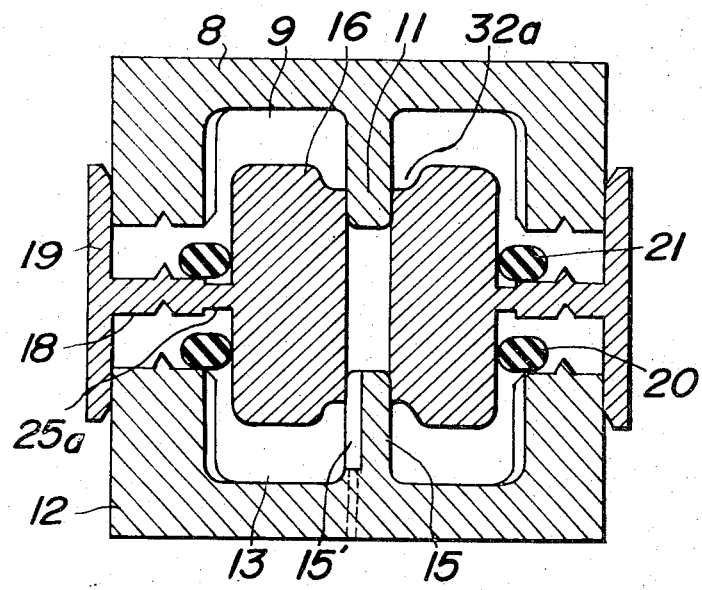
Figure 14:
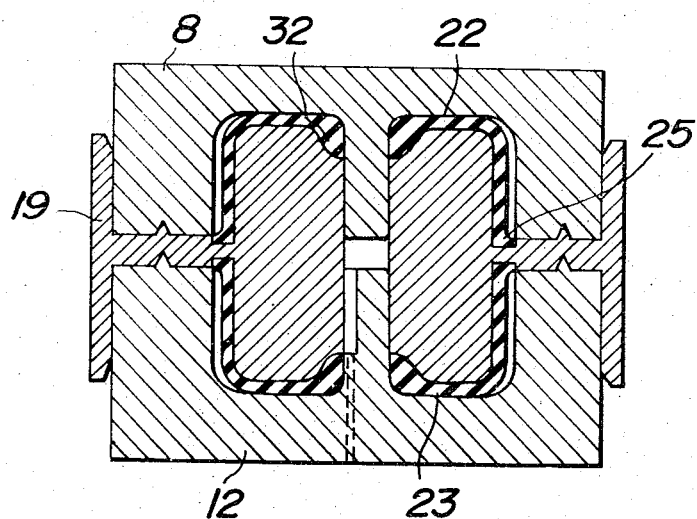

FIGS. 13 to 16 illustrate a process for making the cordless tire as shown in FIG. 12. Two halves 22 and 23 of the tire rubber body 1 are formed by using a mold assembly consisting of an upper half mold 8, a core 16 having a spacer 18, and a lower half mold 12 substantially in the same fashion as described in the foregoing by referring to FIGS. 8 and 9. The manner for making the two halves 22 and 23 of the tire rubber is characterized in its formation of annular enlargements 32 which are to be transformed into the annular beads $b_1$ and $b_2$ in the succeeding stage of the tire making process. Otherwise, the making of the half tire bodies 22 and 23, as illustrated in FIGS. 13 and 14, is substantially identical with that as illustrated in FIGS. 8 and 9. To form the annular enlargements 32, the core 16 of FIGS. 13 and 14 has annular recesses 32a at its inner top edge and its inner bottom edge.

Figure 15:
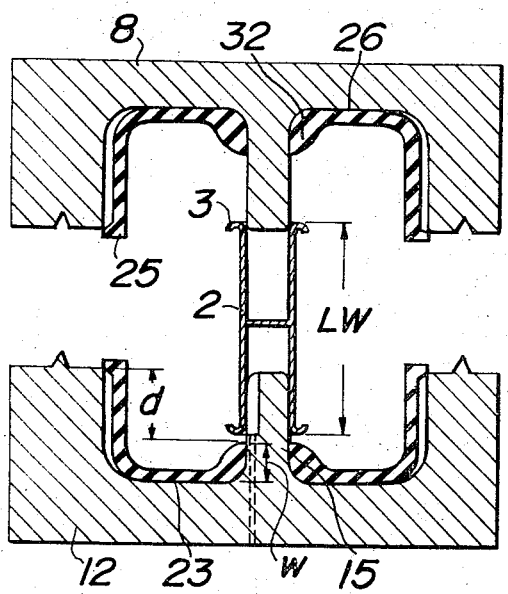
Figure 16:
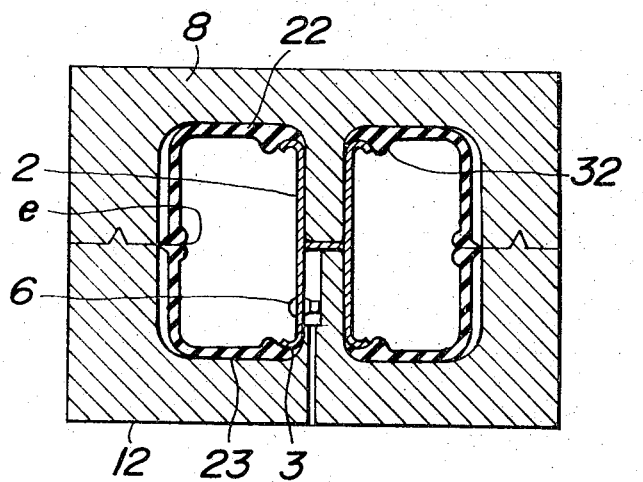

The rubber material for the half tire bodies 22 and 23 can be the same as that for the tire bodies 1 of the embodiments of FIGS. 1 and 7, e.g., crude rubber, or crude rubber reinforced by short fibers or plastics material. After the two half tire bodies are formed, the two half molds 8 and 12 are separated from each other, as shown in FIG. 15. A separately prepared cylindrical hub member 2 is mounted on the lower half hub 12 by fitting the central opening of the hub 2 on a central stud 15 thereof. The hub 2 of FIGS. 15 and 16 is shown as a unitary cylindrical member having opposite ends rolled back outwardly so as to form the annular curved flanges 3 and a central disk flange F integrally secured thereto at right angles to the longitudinal center line thereof. It is, of course, possible to use a hub 2 made of two cup-like half hubs 10 and 14, as shown in FIG. 12.

In order to form the enlarged beads $b_1$ and $b_2$ of FIG. 12, the distance $d$ between the tire equator and the equator side edge of the annular enlargement 32 (FIG. 15), taken in the longitudinal direction of the hub 2, should be substantially shorter than one half of the maximum length LW of the hub 2. The longitudinal direction of the hub 2, in this case, coincides with the direction of the axis of rotation of the cordless tire. The inventors hav found out by tests that the suitable magnitude of the difference between the aforesaid distance $d$ and the length LW/2 is about 10 mm for a cordless tire of PT 19×11.00 3.5 type.

The embodiment of FIG. 12 has annular flanges 3 with holes H for allowing the rubber material to penetrate therethrough. FIGS. 15 and 16, however, do not illustrate such holes H for simplicity's sake. The annular flanges 3 should be pretreated so as to maximize the bond of the annular enlargements 32 to the annular flanges 3.

After being aligned with the lower half mold 12 and the hub 2, the upper half mold 8 is pressed downwards, as shown in FIG. 16. Accordingly, the annular lugs 25 of the half tire bodies 22 and 23 are bonded, so as to form an annular ridge 7 along the peripheral center line $e$ of the cordless tire. As a feature of this embodiment, the annular enlargements 32 of the half tire bodies 22 and 23 are deformed as the upper half mold 8 is pressed downwards, so that the rubber material of the annular enlargements 32 is fastly bonded to the annular flanges 3 of the hub 2. If holes H are provided in the annular flanges 3, the rubber material of the annular enlargements 32 are partially extruded through such holes H, so as to further enhance the bond of the rubber tire body 1 to the hub 2, as shown in FIG. 12.

After the two halves 22 and 23 are joined, the cordless tire thus formed is vulcanized in the same manner as described hereinbefore by referring to FIG. 6.

Figure 17:
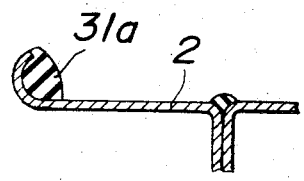
Figure 18:
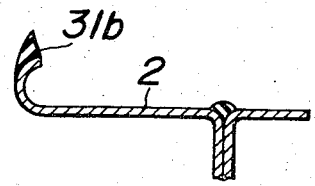

FIGS. 17 and 18 illustrate two different forms of auxiliary bead rubber ring 31a and 31b, respectively. The auxiliary bead rubber ring 31a of FIG. 17 is disposed between the outermost end of the annular flange 3 and the outside surface of the cylindrical portion of the hub 2. On the other hand, the auxiliary bead rubber ring 31b of FIG. 18 extends further outwardly from the flange 3, in radial directions emanating from the axis of rotation of the cordless tire. The auxiliary bead rubber rings 31a and 31b act to strengthen the bond between the flange 3 and the annular enlargement 32 when the flanges 3 of the hub 2 are forced against the annular enlargements 32.

Figure 19:
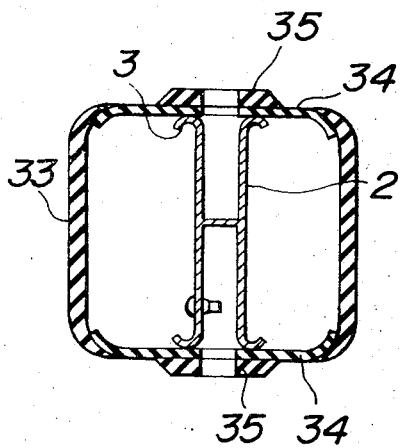
FIGS. 19 and 20 are schematic sectional views of a different cordless tire and a mold assembly for making the same, respectively.
Figure 20:
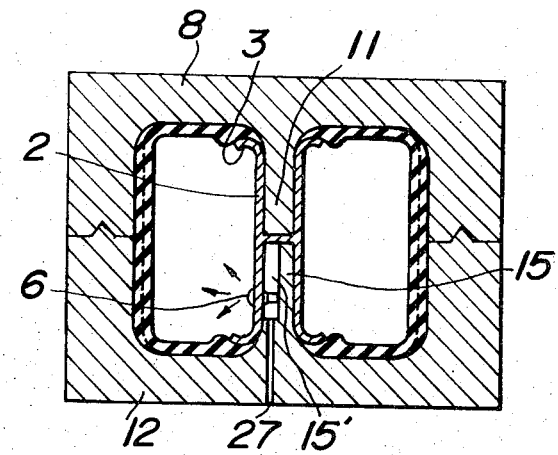

In the preceding embodiments of the invention, the rubber tire body 1 is made of two halves 22 and 23. The invention, however, is not limited to the use of such halved rubber tire body 1. FIGS. 19 and 20 illustrate an embodiment, in which the rubber tire body 1 is made by bonding a separately prepared endless belt-shaped tread rubber and a pair of side rubber disks, instead of molding the two halves of the rubber tire body. Referring to the figures, an endless belt-shaped tread rubber 33 is extruded, and one of a pair of sidewall rubber disks 34 is bonded to one side end of the belt-shaped tread rubber 33, for instance, by applying a suitable adhesive therebetween. A hollow cylindrical hub 2, which is similar to the hub as shown in FIGS. 15 and 16, is placed on the sidewall rubber disk 34, so as to dispose the hub 2 in coaxial relationship with the belt-shaped tread rubber 33, and another sidewall disk 34 is concentrically placed on the opposite end of the hub 2. The peripheral edge of the sidewall rubber disk 34 thus placed on said other end of the hub 2 is bonded to the opposite side edge of the belt-shaped tread rubber 33, for instance, by applying a suitable adhesive thereto.

The two sidewall rubber disks 34 are preferably bonded to outwardly extending annular flanges 3 by lightly pressing the two disks 34 toward each other by a roll means.

A pair of bead-forming rubber disks 35 are bonded to the outer surfaces of the sidewall disks 34, in alignment with the annular flanges 3 of the hub 2, so as to produce a case of the cordless tire, as shown in FIG. 19. The annular flanges 3 are preferably pretreated so as to maximize its bond with the rubber material of the sidewall disks 34.

As apparent to those skilled in the art, the bead-forming rubber cylinders 35 may be provided as an integral part of the sidewall disks 34. In this case, the process of aligning and bonding the separate bead-forming rubber cylinders 35 to the sidewall disks 34 can be dispensed with.

The case of the cordless tire thus formed is now placed in a mold assembly, consisting of an upper half mold 8 and a lower half mold 12, as shown in FIG. 20. To shape the case, it is placed in the lower half mold 12, while fitting the central hollow space of the hub 2 on a cylindrical stud 15 of the half mold 12. Thereafter, the upper half mold 8 is mounted on the case, in register with the lower half mold 12, while inserting the cylindrical stud 11 of the upper half mold 8 into the central hollow space of the hub 2. The two half molds 8 and 12 are forced toward each other, for instance, by pressing the upper half mold 8 downwards. As a result, the rubber material constituting the bead-forming disks 35 are urged against the outwardly extending annular flanges 3, as shown in FIG. 20.

The case of the cordless tire thus formed in the mold assembly is now vulcanized, while filling the inside space of the case with a suitable gas, e.g., air or steam, through a passage 27 of the lower half case 12, a groove 15' bored on the peripheral surface of the stud 15, and a valve 6. The vulcanization of the case, as shown in FIG. 20, can be carried out in the same manner as described in detail hereinbefore by referring to FIG. 6.

What is claimed is:

1. A method for making a cordless tire having a hollow cylindrical metal hub with a longitudinal center line coinciding with the axis of rotation of the tire and a pair of outwardly extending annular flanges integrally formed with said hub at the longitudinally opposite ends thereof, and a shaped rubber shell extending from one of the pair of annular flanges to the other, the cylindrical hub having at its bottom a disk flange located between the pair of annular flanges and extending at right angles to the axis of rotation of the tire, said method comprising the steps of forming two halves of the rubber shell of the tire body as a as a whole by means of a mold assembly composed of two half molds separable in the axial direction of internal cavities thereof and an annular core to be inserted into said cavities, each of said half shells extending from one of said annular flanges to the peripheral center line of the tire, and having along the peripheral center line annular lugs made integral with the side edges of the half bodies opposite to the hub members and bonded to form an annular ridge, bonding the flange side edge of each half shell to the corresponding annular flange of the corresponding hub by snugly fitting a cylindrical stud made integral with each of the two half molds in the corresponding hub, bonding the annular lugs along the peripheral center line of the two half shells to each other to form an annular ridge and form a tire case having a rubber shell integral with the hub, and vulcanizing the tire case thus formed in the mold by pressurizing the inside space of the tire defined by the rubber shell and the cylindrical hub.

2. A method of making a cordless tire according to claim 1, wherein said cylindrical hub is made of two cup-like halves and said half rubber shells are formed as integrally connected to said annular flanges of the two cup-like half hubs, respectively, and said peripheral center line edges of the two half rubber shells are bonded simultaneously with the bonding of the bottoms of the two cup-like half hubs.

3. A method of making a cordless tire according to claim 1 and further comprising a step of securing beforehand a bead rubber ring to the annular flange of each hub, respectively, prior to bonding the rubber shell to the hub, said bead rubber ring being made by using a rubber material which is bondable to said annular flange and to said half rubber shell.

4. A method of making a cordless tire according to claim 1 and further comprising a step of boring holes in each of said annular flanges so as to cause the rubber material of said rubber shell to penetrate through said holes when said rubber shell is bonded to said hub.

5. A method according to claim 1, wherein said vulcanization is effected while filling the inside space defined by the rubber shell and the hub with an inactive gas, said inactive gas reacting with neither of the hub and the rubber shell.

6. A method according to claim 5, wherein said inactive gas is air.

7. A method according to claim 5, wherein said inactive gas is steam.

8. A method according to claim 1, wherein said hub is made of steel.

9. A method according to claim 1, wherein said rubber shell is made of a rubber material which is reinforced by short fibers.

* * * * *